No. 787,499. PATENTED APR. 18, 1905.
F. G. DICKERSON.
TIPPING MACHINE.
APPLICATION FILED JULY 22, 1903.
5 SHEETS—SHEET 1.

Witnesses: Inventor:
Edward G. Eisfeldt Fred G. Dickerson
J B Weir by Elliott & Hopkins
Attys

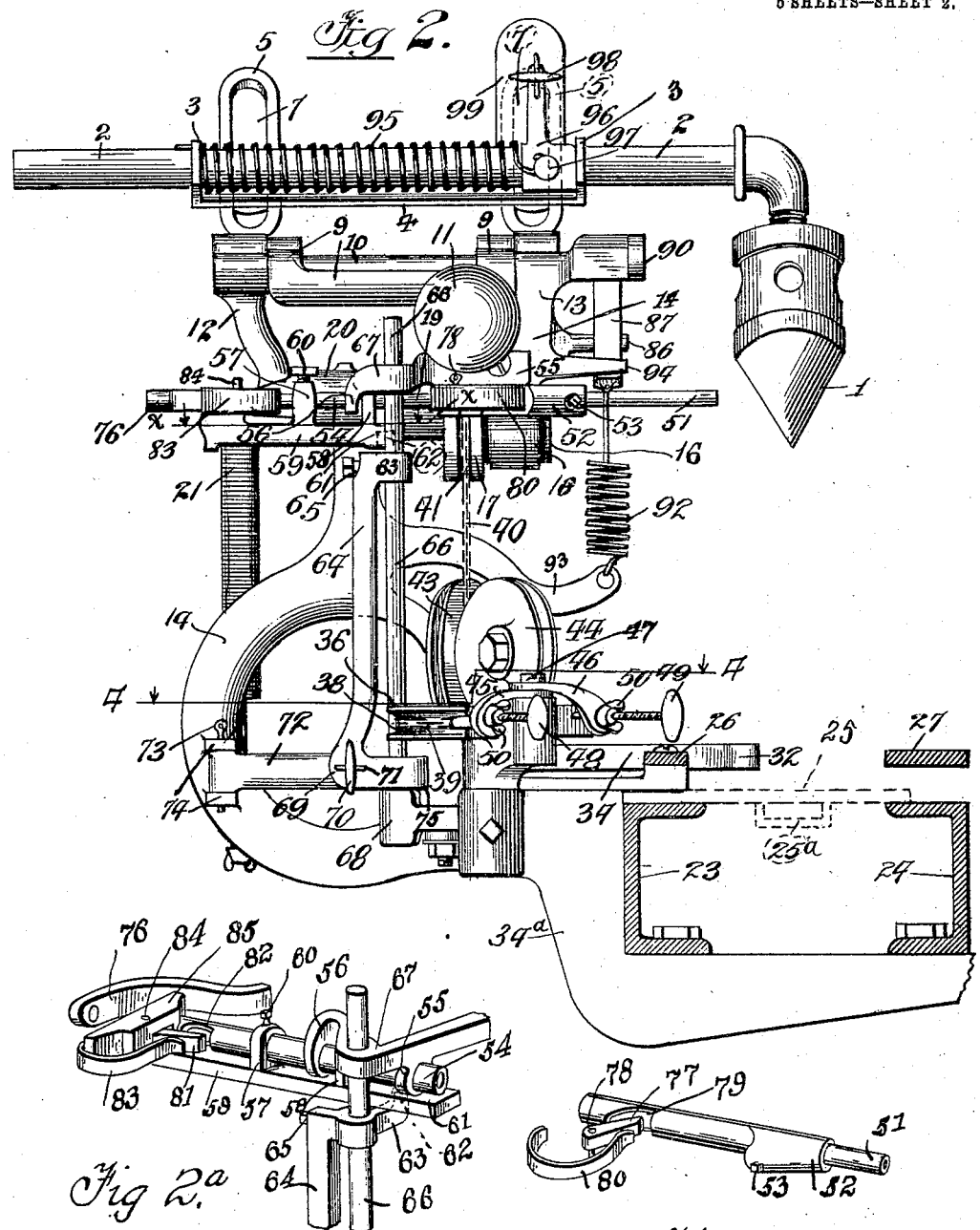

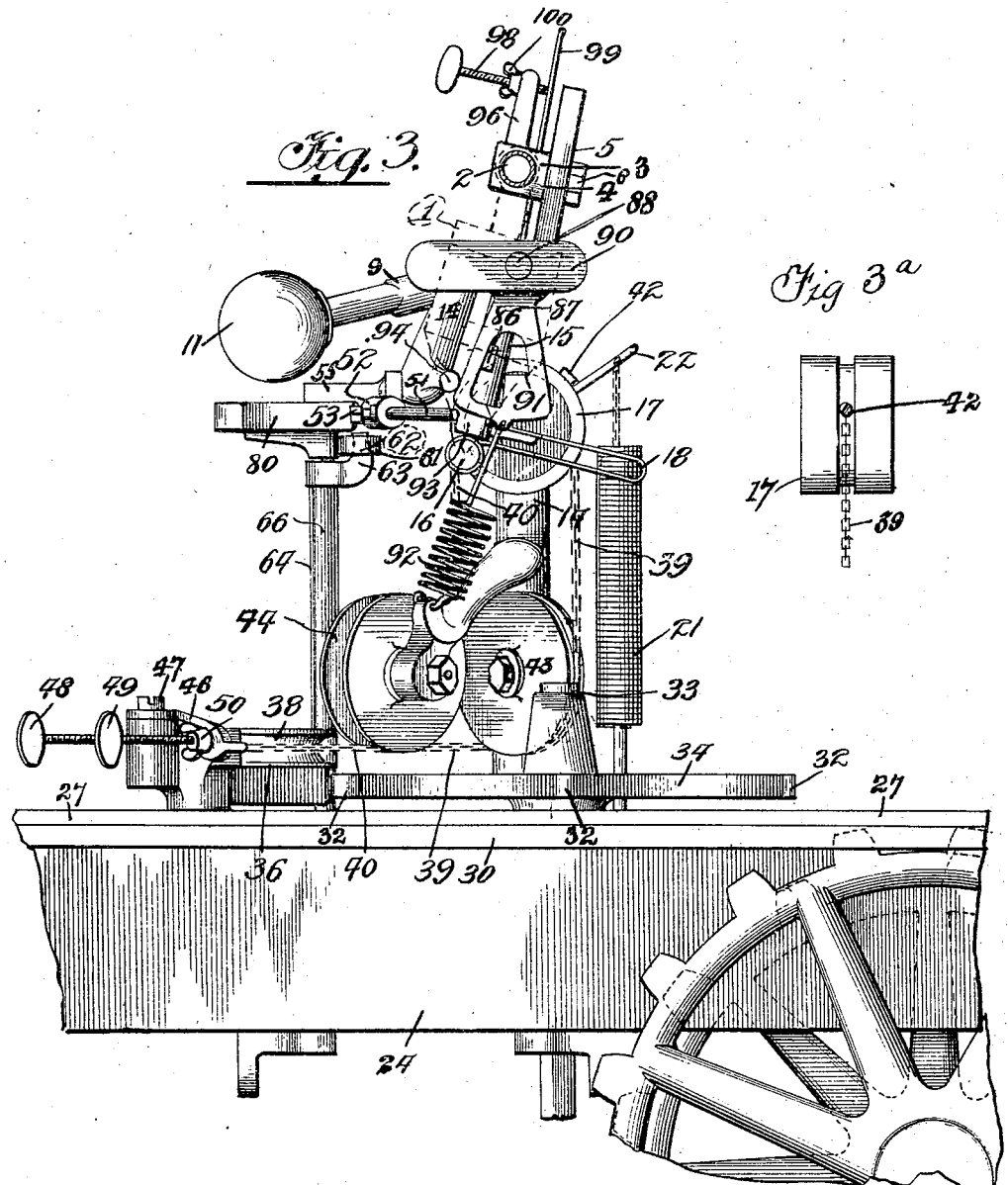

No. 787,499. PATENTED APR. 18, 1905.
F. G. DICKERSON.
TIPPING MACHINE.
APPLICATION FILED JULY 22, 1903.
5 SHEETS—SHEET 4.
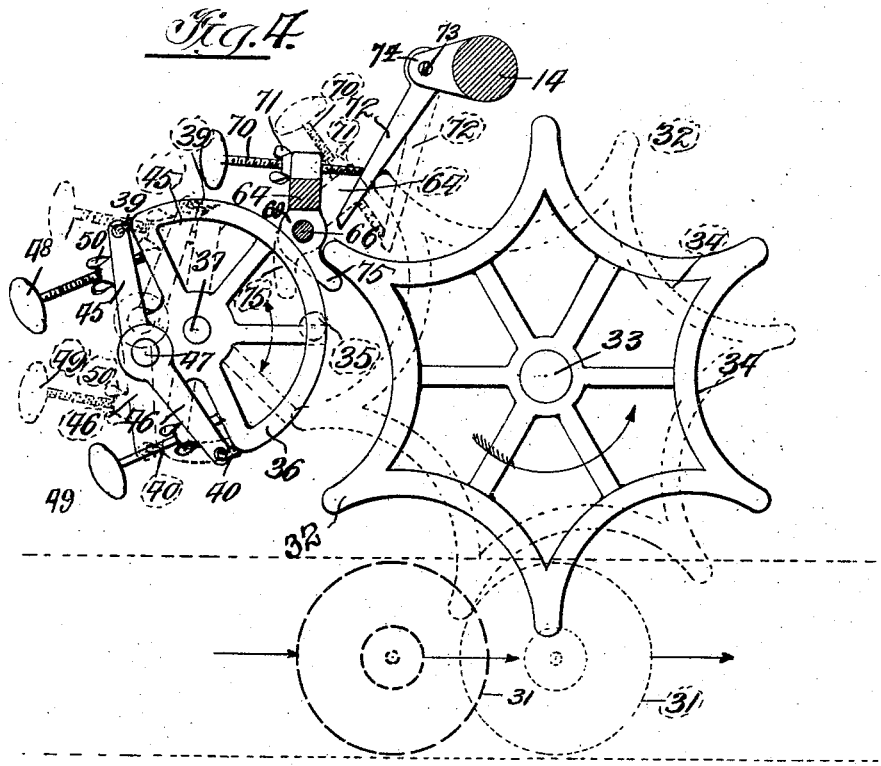
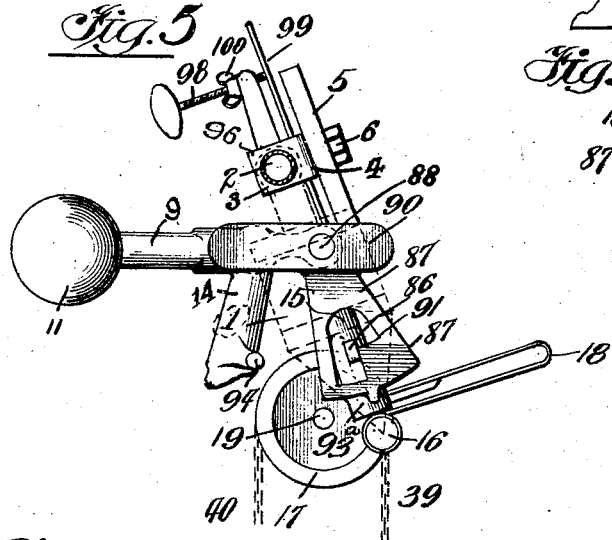
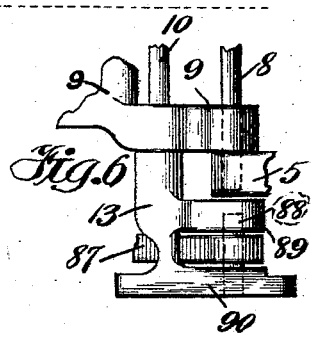
Witnesses:
Edward C. Fenfeldt
J. B. Weir
Inventor:
Fred G. Dickerson
by Elliott & Hopkins attys

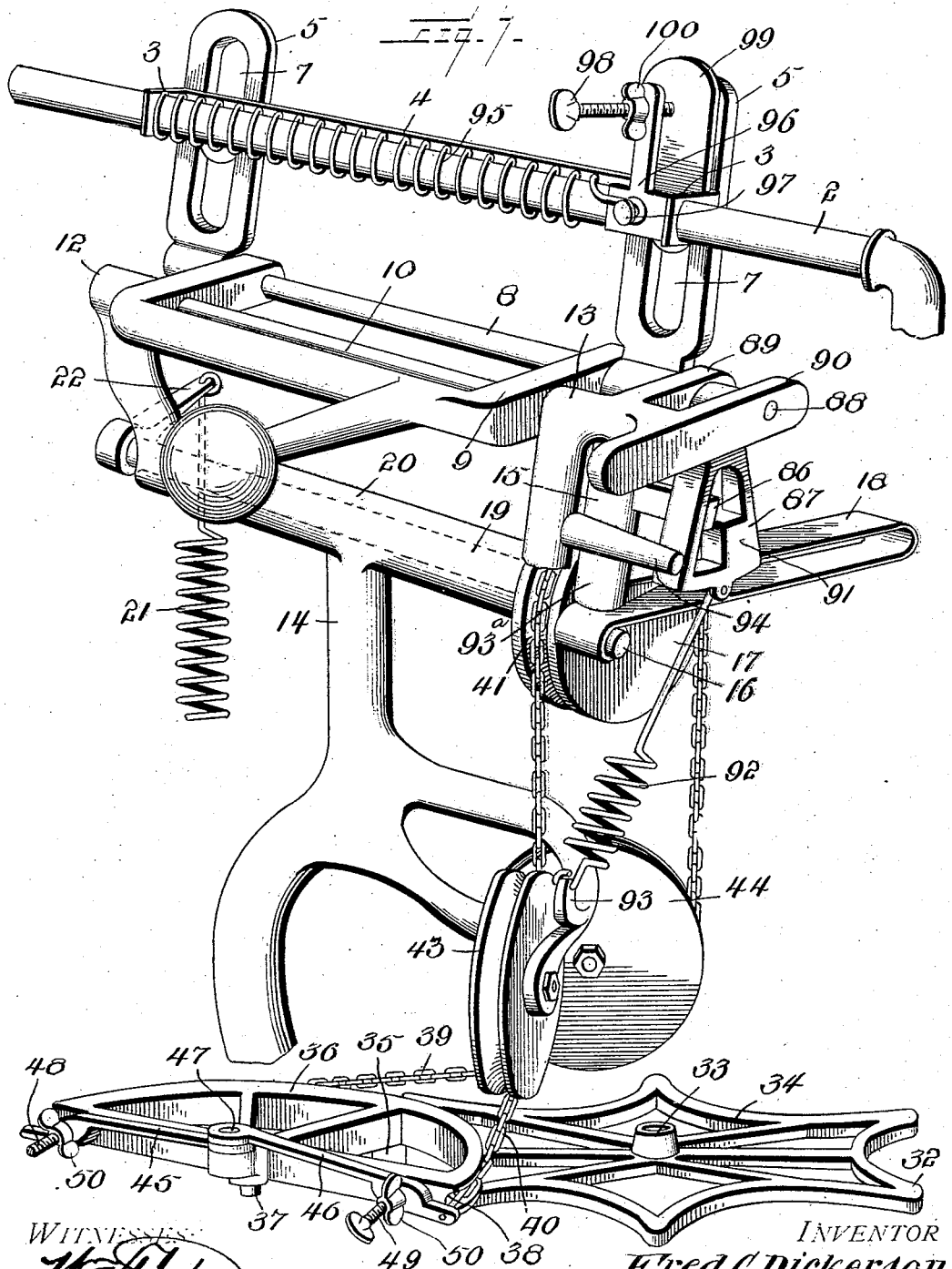

No. 787,499.

Patented April 18, 1905.

UNITED STATES PATENT OFFICE.

FRED G. DICKERSON, OF CHICAGO, ILLINOIS.

TIPPING-MACHINE.

SPECIFICATION forming part of Letters Patent No. 787,499, dated April 18, 1905.

Application filed July 22, 1903. Serial No. 166,512.

*To all whom it may concern:*

Be it known that I, FRED G. DICKERSON, a citizen of the United States, residing at Chicago, in the county of Cook and State of Illinois, have invented certain new and useful Improvements in Tipping-Machines, of which the following is a full, clear, and exact specification.

This invention relates to that class of soldering-machines commonly known in the art as "tipping-machines," designed for closing the small vent in the cap or top of a can or other vessel usually left therein for the escape of the steam or vapor arising from the contents. In machines of this class it is common to employ an oscillating soldering-iron which is arranged to sweep or swing across the top of each can as the cans file past it and deposit a drop of solder over the vent; and the invention has for one of its objects to provide improved and efficient means whereby the movement of the can past the soldering-iron imparts the desired action to the latter and also to the means for feeding the solder automatically to the iron.

A further object of the invention is to provide means whereby the iron is moved forwardly in unison with the can, but at the same time may yield and permit the balance of the mechanism to move independently thereof, and thus avoid breakage of the parts should it engage the can improperly or meet an obstruction of any kind.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

Figure 1:
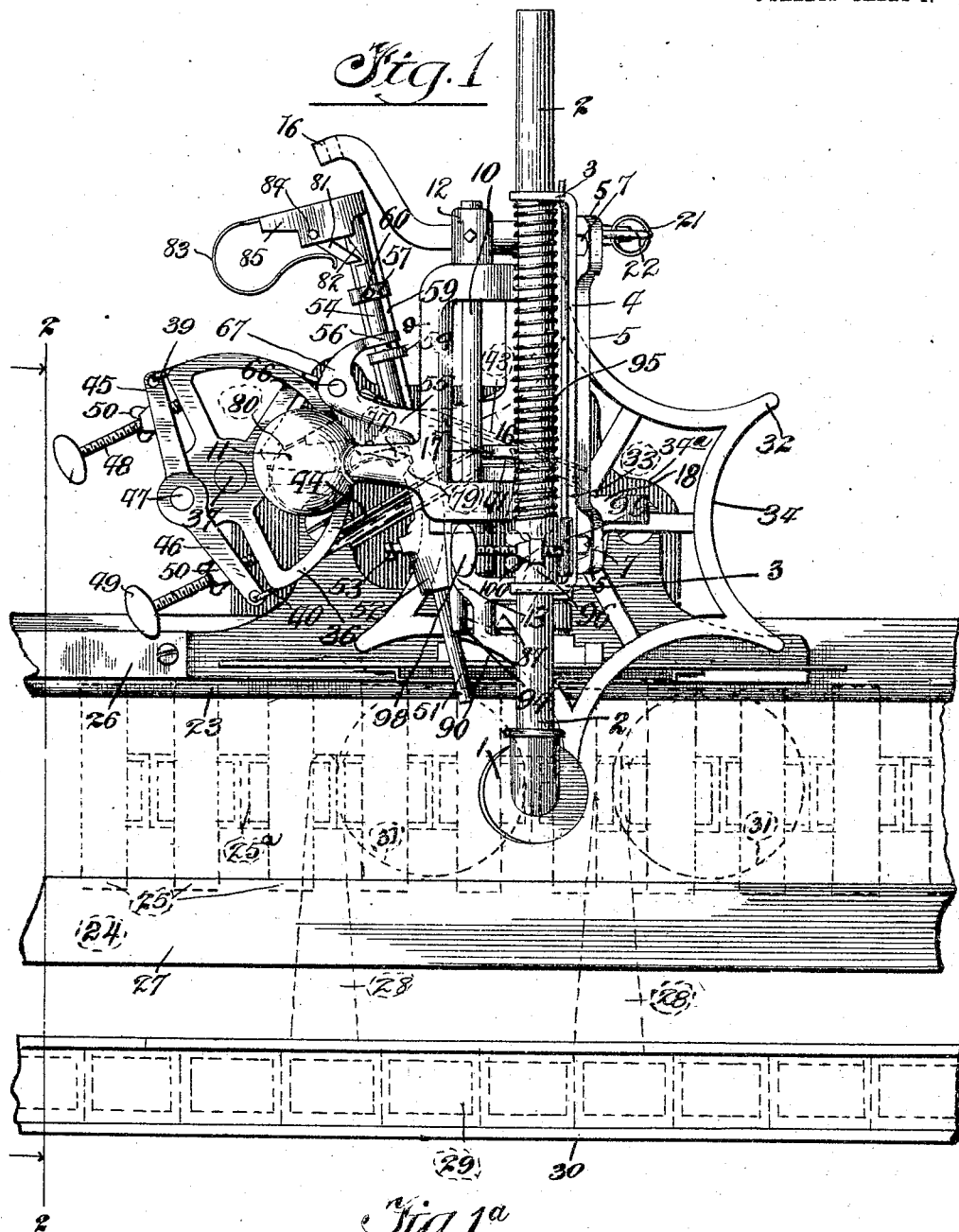
Figure 1A:
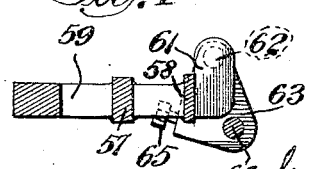

In the said drawings, Figure 1 is a plan view of my improved tipping-machine. Fig. 1$^a$ is a detail plan section on the line $x\,x$, Fig. 2. Fig. 2 is a cross-section thereof on the line 2 2, Fig. 1. Fig. 2$^a$ is a perspective view of the rear part of the solder-feeding device. Fig. 2$^b$ is a perspective view of the forward part thereof. Fig. 3 is a side elevation thereof with the iron cut away. Fig. 3$^a$ is a detail edge view of the crank-disk. Fig. 4 is a detail plan section on the line 4 4, Fig. 2. Fig. 5 is a detail side elevation of a part of the iron-actuating mechanism hereinafter described. Fig. 6 is a detail plan view of a portion thereof. Fig. 7 is a detail perspective view of the upper part of the machine.

1 is the soldering or tipping iron, which is supported upon the downturned end of a horizontally-arranged rocker-shaft 2, made hollow, so as to also serve as a conduit or passage for supplying the iron 1 with gas, whereby it is heated. This shaft 2 is journaled in suitable bearings 3 on a bar or plate 4, which is secured to the frame 5 by set-screws 6, Figs. 3 and 5, passing through vertical slots 7 in the frame 5, whereby the bar 4, with the shaft 2, may be adjusted for raising or lowering the iron 1 with relation to the cans. The frame 5 is supported pivotally upon a shaft or pin 8, Figs. 6 and 7, mounted in one end of a frame or lever 9, which in turn is pivotally supported or fulcrumed upon a shaft 10 and carries a counterweight 11, which substantially counterbalances the frame 5 and the parts supported thereon. The shaft 10 is journaled in a pair of lugs or arms 12 13, formed on or secured to the main frame 14.

Depending from the frame 5, at one end thereof, is an arm 15, which is suitably secured by yielding means to a wrist-pin 16 of a crank-disk 17, the means employed being a U-shaped spring 18, which is connected at one end to the arm 15 and at its other end surrounds the wrist 16, so that as the crank-disk 17 rotates or oscillates it will impart oscillatory motion to the frame 5, and consequently cause the iron 1 to swing back and forth in a vertical plane across the top of the can as the latter is moved past it by means which will be presently described. The crank-disk 17 is secured to a shaft 19, Figs. 5 and 7, journaled in a suitable bearing 20, formed on the main frame 14, and secured to this shaft 19 is a spring 21, which serves, in conjunction with the counterweight 11, to return the parts to their normal position after the iron has been deflected in the direction of the movement of the can, the means of attachment between the spring 21 and the shaft 19 which I prefer to employ for the sake of simplicity, efficiency, and cheapness being an arm or lever 22, whose leverage decreases as the tension of the spring increases, and thereby maintains a uniform resistance against the rotation of the shaft 19.

Arranged directly under the iron 1 and extending in the direction of its line of oscillation is a runway for the cans consisting, preferably, of a pair of angle-irons 23 24, which support a conveyer 25, on which the cans rest and by which they are conducted under the iron 1, lateral movement of the cans on the conveyer 25 being restrained by suitable guide-bars 26 27. This conveyer and the means acting in conjunction therewith for forcing the cans past the iron 1 need not be fully described and illustrated in this application, as the same constitutes the subject-matter of the claims of my pending application, Serial No. 156,535, filed May 11, 1903, and the particular construction of conveyer and can-advancing means is entirely immaterial, so far as the present invention is concerned, so long as it be capable of forcing the cans one at a time past the iron 1. Therefore any suitable conveyer and can-advancing means may be employed, the form briefly indicated by dotted lines in the present application consisting of the conveyer 25, already referred to, which is composed of a number of cross-slats secured to a chain 25ª, serving as a means of supporting the cans and yieldingly advancing them while they are positively advanced by a number of pushers 28, extending partially across the runway and secured to a second chain 29, which is held by a suitable guide 30, the two chains being driven together, if desired, by any means not necessary to illustrate. As the cans, which are shown at 31 in dotted lines, file past the iron 1 they successively come into engagement with the arms 32 of a star-wheel 34, which is arranged horizontally with its arms projecting partially across the path of the cans, as better illustrated in Figs. 1 and 4, and is journaled on a suitable pivot 33, fixed in base-plate 34ª, supported on the main frame 14. As the cans engage and rotate the arms 32 on one side one of said arms on the other side comes into engagement with a depending lug 35, formed on a sector 36, which is journaled in a horizontal plane on a pivot 37 and has a grooved periphery 38, in which run two chains or other flexible connections 39 40, suitably secured to the shaft 19 in such a manner that the oscillation of the sector 36 by the star-wheel 34 will impart an oscillatory movement to the iron 1 in the direction of movement of the cans 31, while the pull of the spring 21 will return the iron 1 and connected parts to their normal or former position and impart a reverse rotation or partial rotation to the sector 36. A convenient means of effecting this connection between the chains 39 40 and the shaft 19 consists of a pulley or drum, which may be constituted by the crank-disk 17, the latter being formed with a periphery of sufficient width to carry the chains 39 40 and, if desired, provided with a groove 41 to avoid the possibility of the chains slipping off, the chains being rigidly attached to the periphery of the disk 17 by any suitable means, such as a screw or lug 42, Figs. 3 and 3ª, and the chains being passed over the disk 17 in opposite directions and guided by idlers 43 44, respectively. As a means of attaching the chains to the sector 36 and at the same time providing for their independent adjustment I attach them to the outer ends of arms or levers 45 46, respectively, which are pivoted on a pin 47, carried by the hub of the sector, and through these arms or levers pass adjusting-screws 48 49, respectively adapted to impinge the back of the sector, and by forcing the arms or levers 45 46 away from the sector tighten the chains, 50 being lock-nuts on the screws 48 49 for holding them to their adjustment.

51 is a tube or canal for the solder, which is mounted upon the frame 14 in a boss or lug 52 and is held therein in any suitable way, as by set-screw 53, and arranged at the end of the tube or canal 51 and in a line therewith is a second tube 54, through which the solder passes prior to entering the tube 51. This tube 54 slides horizontally in suitable bearings 55 56, secured to the frame 14, and it also passes through two perforated ears 57 58, projecting upwardly from a bar 59 and to which bar it is rigidly secured by a set-screw 60, threaded in the ear 57, so as to be compelled to move therewith. One end of the bar 59 is provided with a vertically-perforated boss 61, in which engages a crank-pin 62, projecting upwardly from a crank 63, which is formed on the upper end of a bar 64, secured by set-screw 65 to a vertical shaft 66, journaled at its upper end in a bearing 67 and at its lower end in bearing 68. The lower end of the bar 64 is offset or provided with a boss 69, so as to constitute a crank-arm, and through this boss or crank-arm passes horizontally an adjusting-screw 70, which is provided with a lock-nut 71 and is adapted to impinge against the back of a tongue 72, pivoted by pin 73 to ears 74 on frame 14, and so arranged as to be struck and deflected by the points 32 of the star-wheel. The lower end of the bar 64 is also provided with a boss or finger 75, which is arranged in the path of the points 32 of the star-wheel and is adapted to be struck and deflected thereby as the star-wheel revolves. Each time a can passes the star-wheel 34 one of the points 32 of the latter comes into engagement, first with the tongue 72 and then with the finger 75. In engaging and oscillating the tongue 72 it rotates the bar 64 on the shaft 66 in an outward direction a greater or less extent, according to the adjustment of the adjusting-screw 70, and thereby forces the bar 59 outwardly through the action of the horizontal crank 63, and consequently moves the tube 54 away from the tube or canal 51. The outer end of the bar of solder passing through the tubes 54 51 is held in line with the tube 54 by any suitable means—such, for example, as a guide 76—so that the tube 54 may slide backwardly over the solder without moving the latter, and in order that the solder may not make a retrograde movement in the tube or canal 51 a holding dog or pawl 77 is provided. This pawl is pivoted on a vertical pin 78 in the piece 52, in which the tube 51 is secured, and it is pressed into a recess 79 in said piece 52 by means of a spring 80, so as to engage the bar of solder where it passes through piece 52 into the tube 51. On the outer end of bar 59 is pivoted a dog or pawl 81, which guides the bar of solder into the tube 54 through a notch 82 in said tube and is held in engagement therewith by means of a spring 83. This pawl 81 is turned in the same direction as the pawl 77, so that as the tube 54 moves outwardly together with the pawl 81 the pawl 81 will slide backwardly over the solder; but as the point 32 comes into engagement with the finger 75 the bar 59 will be returned to its former inner position, and thereby feed the solder forwardly through the canal 51 by bringing the pawl 81 into engagement therewith. The pawl 81 is pivoted on a pin 84 and mounted on a block 85, which serves as a means for carrying the tube 54 and the spring 83. By adjusting the screw 70 it will be seen that the extent of the feeding movement of the pawl 81 may be varied to suit the requirements. The tube 54 is supported at its outer end by the bearing 56, above described, and this latter also serves as a stop for limiting its outward movement in that it is arranged to be engaged by the lug or ear 58. The further movement of the point 32 after passing the finger 75 brings it into engagement with the lug 35 on the sector 36 and by thus oscillating said sector causes the chain 40 to rotate the shaft 19 toward the left, as viewed in Figs. 1, 3, and 5, and thereby carry the point of the tipping-iron 1 in the direction of movement of the can and in unison with the can, so that as the can moves along the point of the iron will descend into engagement with the vent or other place on the can to be soldered. When the iron 1 is in its initial or inactive position, as shown in full lines in Figs. 1 and 2 and in dotted lines in Fig. 3, it is supposed to be slightly above the surface of the can; but as the crank 16 moves downwardly it is brought down into yielding contact with the can through the intermediary of the spring 18 and follows the can until point 32 passes lug 35, whereupon spring 21 and weight 11 act to rotate shaft 19 in the opposite direction or toward the right, as viewed in Fig. 3, and by thus returning the crank 16 around the lower side of its arc of movement raises the frame 5, which carries the iron 1. In order, however, that the iron may not engage the cans during its return movement and to that end may return in a higher path than the path of its soldering-stroke, the arm 15 is provided with a lug 86, which projects into a sling 87, pivoted concentrically with the shaft 8, on which the frame 5 is pivoted by any suitable means—such, for example, as a pin 88, passing through two lugs 89 90, formed on the arm 13—and in this sling is formed a step 91, which is adapted to engage under and support the lug 86 during the return stroke of the iron 1. The sling 87 when in its initial or inactive position is held substantially perpendicular either by gravity or by spring 92, secured to the lower end thereof and to an arm 93 of the main frame; but as the crank 16 moves downwardly it pulls the lug 86 down into the sling below the upper edge of step 91 in the manner shown in Fig. 5, and consequently deflects the sling 87 toward the right or in the direction of movement of the crank. Before the crank 16 completes this movement toward the right it carries the lug 86 above the step 91, and the spring 92 or gravity thereby returns the sling 87 toward the left until the step 91 engages under the lug 86, and by this time the point 32 of the star-wheel will have passed the lug 35 on the sector, and hence released shaft 19, which, together with disk 17, is instantly returned to its former or initial position, the step 91 of the sling following under the lug 86 until the sling reaches its perpendicular position, as shown in Fig. 3, and the lug is raised out of engagement with step 91 and carried to the opposite side of the sling by the upwardly rounding movement of the crank 16. In order, however, that the return movement of the frame 5 may not be absolutely dependent upon the spring 18, it is preferable to extend the arm 15 downwardly in the form of a boss 93$^a$ in such a position as to engage the crank-pin 16 and to be raised thereby at both ends of the throw of the crank, thus insuring the lifting of lug 86 upon the step 91 when making the forward stroke and in a measure supporting the frame 5 and holding the iron aloof at the limit of the return stroke. The return movement of the sling 87 may be limited by a stop 94, projecting from the arm 13. In order that the iron may yield when making its return stroke in the event it should meet an obstruction of any kind, the shaft 2 is held yieldingly against rotation toward the left, as viewed in Figs. 1 and 3, by means of a spring 95 or any other suitable device, said spring being coiled on the shaft 2 and secured at one end to one of the bearings 3 and at the other end to an arm 96, which is rigidly secured to the shaft 2 by set-screw 97 and carries at its upper end an adjusting-screw 98, arranged to impinge against a plate 99, projecting upwardly from frame 5, 100 being a jam-nut for holding the screw 98 at its adjustment. By this means it will be seen that the iron is held against oscillation independently of the frame 5 in one direction by the adjusting-screw 98 and plate 99, which latter may, if desired, be slightly elastic, so as to avoid having the connections absolutely rigid, while it is held against oscillation in the opposite direction by the spring 95, and consequently may yield to the extent of a quarter-rotation or more, if necessary, when making its return stroke. By means of the adjusting-screw 98 the point of the iron 1 may be accurately adjusted with relation to the points 32 at the time they engage the lug 35, and consequently with relation to the vent in the can at the time the can engages the star-wheel for actuating the mechanism.

Having thus described my invention, what I claim as new therein, and desire to secure by Letters Patent, is—

1. In a can-tipping machine, the combination of a tipping-iron movable toward and with the can, a wheel having points arranged to be engaged and rotated by the cans, a sector having a lug arranged to be engaged and deflected by said points, an adjustable connection between said sector and iron for imparting the movement of said wheel to the iron, and means for adjusting said connection.

2. In a can-tipping machine, the combination of a tipping-iron movable toward and with the can, a sector, a pivoted lever movable with said sector, a set-screw passing through said lever and impinging said sector for adjusting the lever relatively thereto, a flexible connection secured to said lever and running against the periphery of the sector, means for operatively connecting said connection with the iron for rotating the latter, and means for oscillating said sector.

3. In a can-tipping machine, the combination of a tipping-iron movable toward and with the can, means for feeding solder to said iron, a rotary member having projections arranged to be engaged and rotated by the cans, two deflectable members arranged in the line of movement of said projections and adapted to be successively engaged thereby, means connecting said latter members with said solder-feeding means for respectively actuating the latter in opposite directions, and means for imparting the movement of said rotary member to said iron.

4. In a can-tipping machine, the combination of a tipping-iron movable toward and with the can, means for feeding solder to said iron, a rotary member having projections arranged to be engaged and rotated by the cans, two deflectable members arranged in the line of movement of said projections and adapted to be engaged thereby, adjustable means operatively connecting said deflectable members with the solder-feeding means for moving the latter in opposite directions, and means for imparting the movement of said rotary member to said iron.

5. In a can-tipping machine, the combination of a tipping-iron movable toward and with the can, a rotary member having projections adapted to be engaged and rotated by the cans, a deflectable tongue arranged in the line of movement of said projections and adapted to be engaged thereby, means for feeding solder to said iron, an adjusting-screw operatively connected with said solder-feeding means and arranged to impinge said tongue, whereby said solder-feeding means is actuated in one direction, means for actuating said solder-feeding means in the opposite direction, and means for imparting the movement of said rotary member to said iron.

6. In a can-tipping machine, the combination of a tipping-iron movable toward and with the can, a pivot on which said iron is mounted and means for yieldingly holding said iron against rotation on said pivot.

7. In a can-tipping machine, the combination of a tipping-iron movable downwardly and laterally in the direction of movement of the can, and also movable pivotally, and means for yieldingly resisting said pivotal movement.

8. In a can-tipping machine, the combination of a tipping-iron movable laterally in the direction of movement of the can and also pivotally, means for yieldingly resisting said pivotal movement, and adjusting means for pivotally moving the iron against the action of said yielding resistance.

9. In a can-tipping machine, the combination of a tipping-iron movable laterally in the direction of movement of the can, a rotary shaft on which said iron is mounted, a spring for resisting the rotation of said shaft in one direction, and means for causing the rotation of said shaft against the resistance of said spring.

10. In a can-tipping machine, the combination of a tipping-iron movable laterally in the direction of movement of the can, a shaft supporting said iron, a spring for rotating said shaft in one direction, an arm secured to said shaft and an adjusting-screw for adjusting said arm and rotating said shaft against the action of said spring.

11. In a can-tipping machine, the combination of a tipping-iron movable downwardly and laterally, a sling movable laterally with said iron and having a step, a lug connected with said iron and movable therewith, and adapted to engage said step when the iron makes its lateral movement in the direction of movement of the can, a stop for limiting the return movement of said sling, and a spring for producing the return movement of said sling.

FRED G. DICKERSON.

Witnesses:
F. A. HOPKINS,
M. B. ALLSTADT.